(12) United States Patent
Grant

(10) Patent No.: US 7,261,295 B2
(45) Date of Patent: Aug. 28, 2007

(54) JUMP FOR MUSIC GAME

(76) Inventor: Sybil Barbara Marilyn Grant, PO Box 1081, Mandeville, Manchester (JM)

( * ) Notice: Subject to any disclaimer, the term of this patent is extended or adjusted under 35 U.S.C. 154(b) by 272 days.

(21) Appl. No.: 11/024,446

(22) Filed: Dec. 30, 2004

(65) Prior Publication Data

US 2006/0145419 A1    Jul. 6, 2006

(51) Int. Cl.
*A63F 3/00* (2006.01)
(52) U.S. Cl. .............................. 273/242; 273/459
(58) Field of Classification Search ............. 273/242, 273/288, 301, 236, 440, 459; 434/128, 178; 84/470 R
See application file for complete search history.

(56) References Cited

U.S. PATENT DOCUMENTS

| | | | | |
|---|---|---|---|---|
| 1,099,372 A * | 6/1914 | Hughes | ............... | 84/471 R |
| 1,945,398 A * | 1/1934 | Gregg | ............... | 84/471 R |
| 2,447,213 A * | 8/1948 | Sledge | ............... | 84/470 R |
| 3,070,371 A * | 12/1962 | Hearle | ............... | 273/287 |
| 3,715,951 A * | 2/1973 | Lanaro | ............... | 84/470 R |
| 4,832,605 A * | 5/1989 | Bragin | ............... | 434/168 |
| 5,254,008 A * | 10/1993 | Dawson | ............... | 434/427 |
| 6,086,378 A * | 7/2000 | Johnson | ............... | 434/128 |
| 6,464,508 B1 * | 10/2002 | Ryan | ............... | 434/365 |
| 2006/0076733 A1 * | 4/2006 | Ritchie et al. | ............... | 273/242 |
| 2006/0097449 A1 * | 5/2006 | Gagnon | ............... | 273/242 |
| 2006/0145419 A1 * | 7/2006 | Grant | ............... | 273/242 |

* cited by examiner

*Primary Examiner*—Raleigh W. Chiu
(74) *Attorney, Agent, or Firm*—Christopher & Weisberg, P.A.

(57) ABSTRACT

This is a musical rhythms game whereby players move to rhythms of music notation placed on a staff. There are two separate versions—a floor and table top version, which are designed to help players develop more rhythmic awareness and to create a better understanding of how music notation works on a staff.

16 Claims, 11 Drawing Sheets

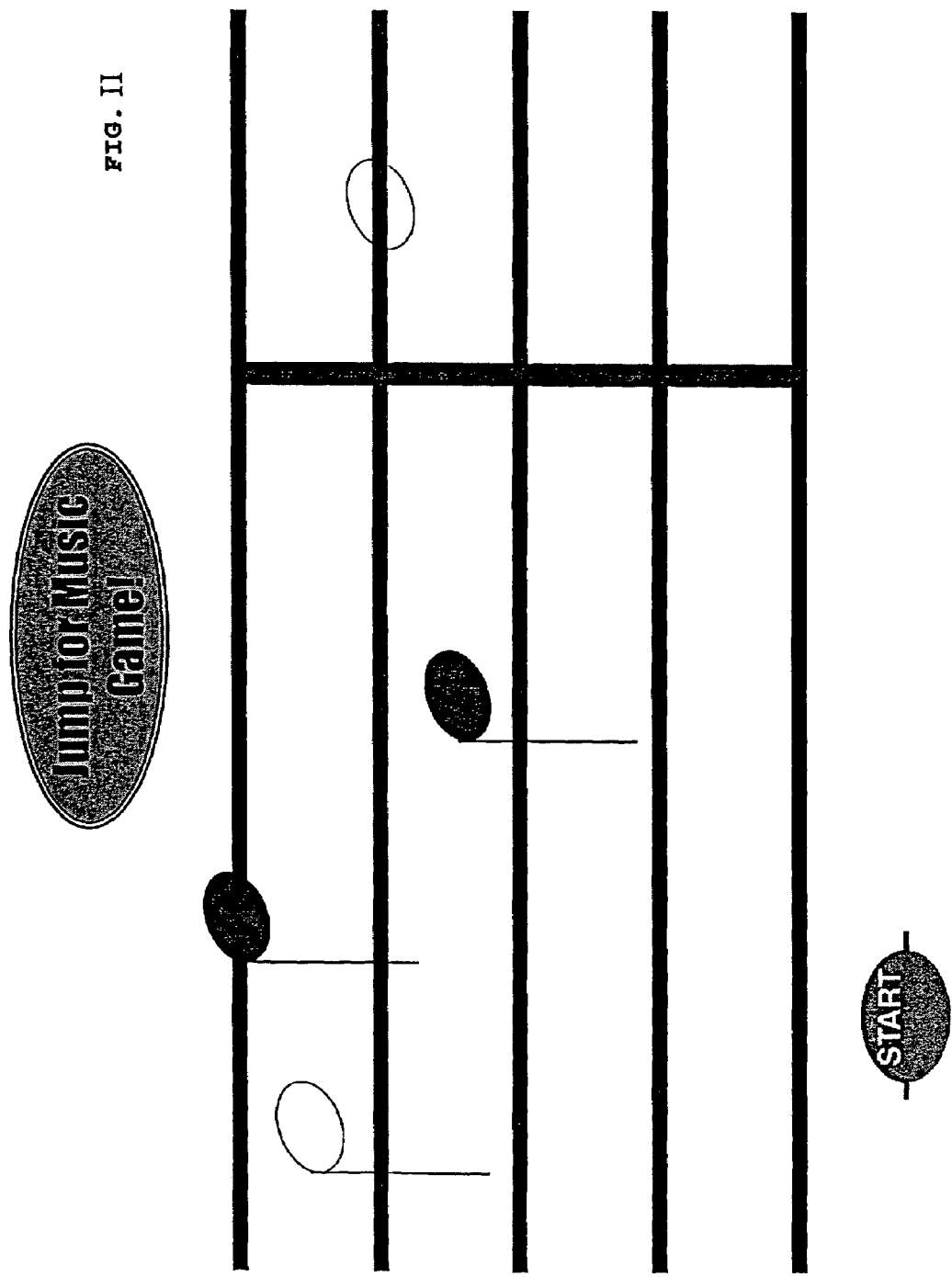

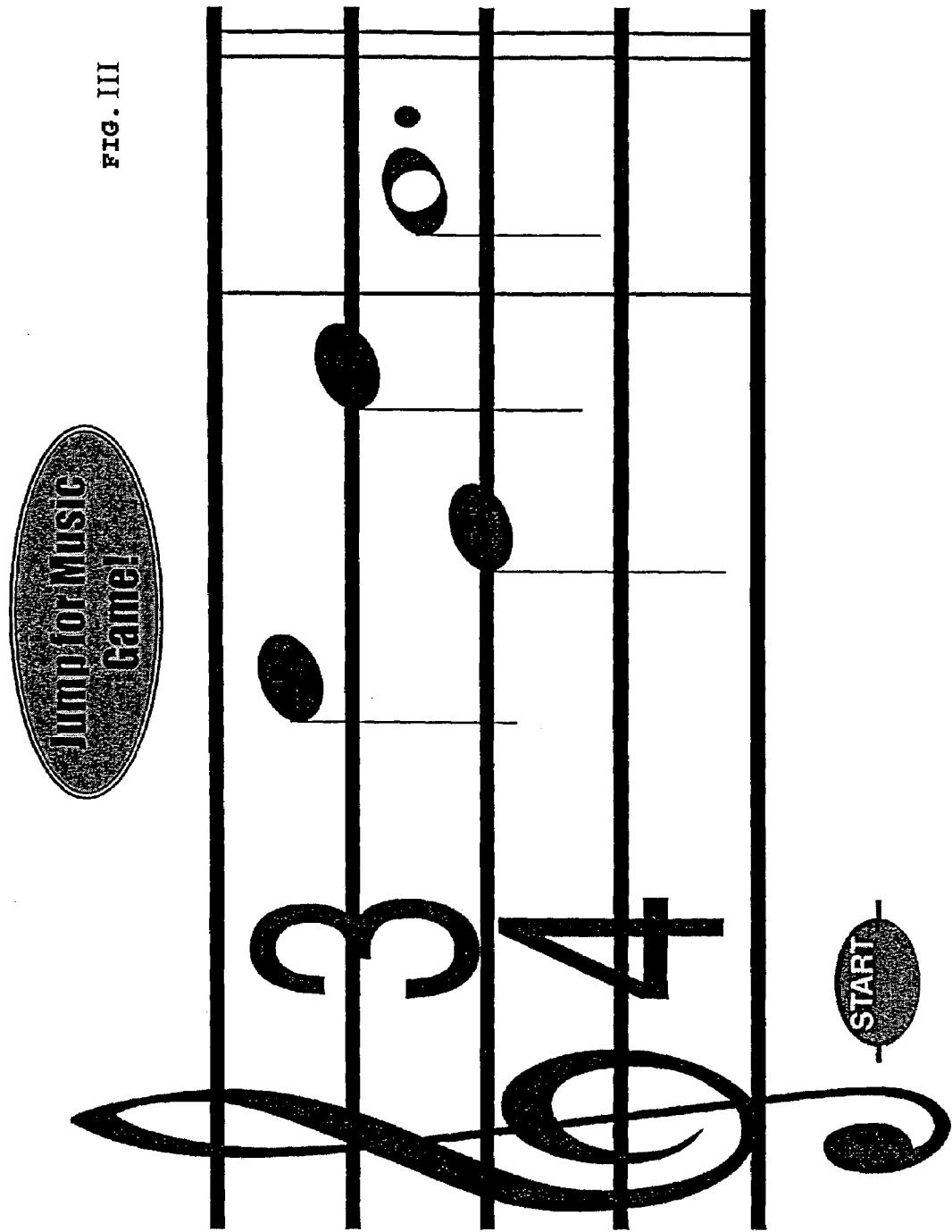
FIG. III

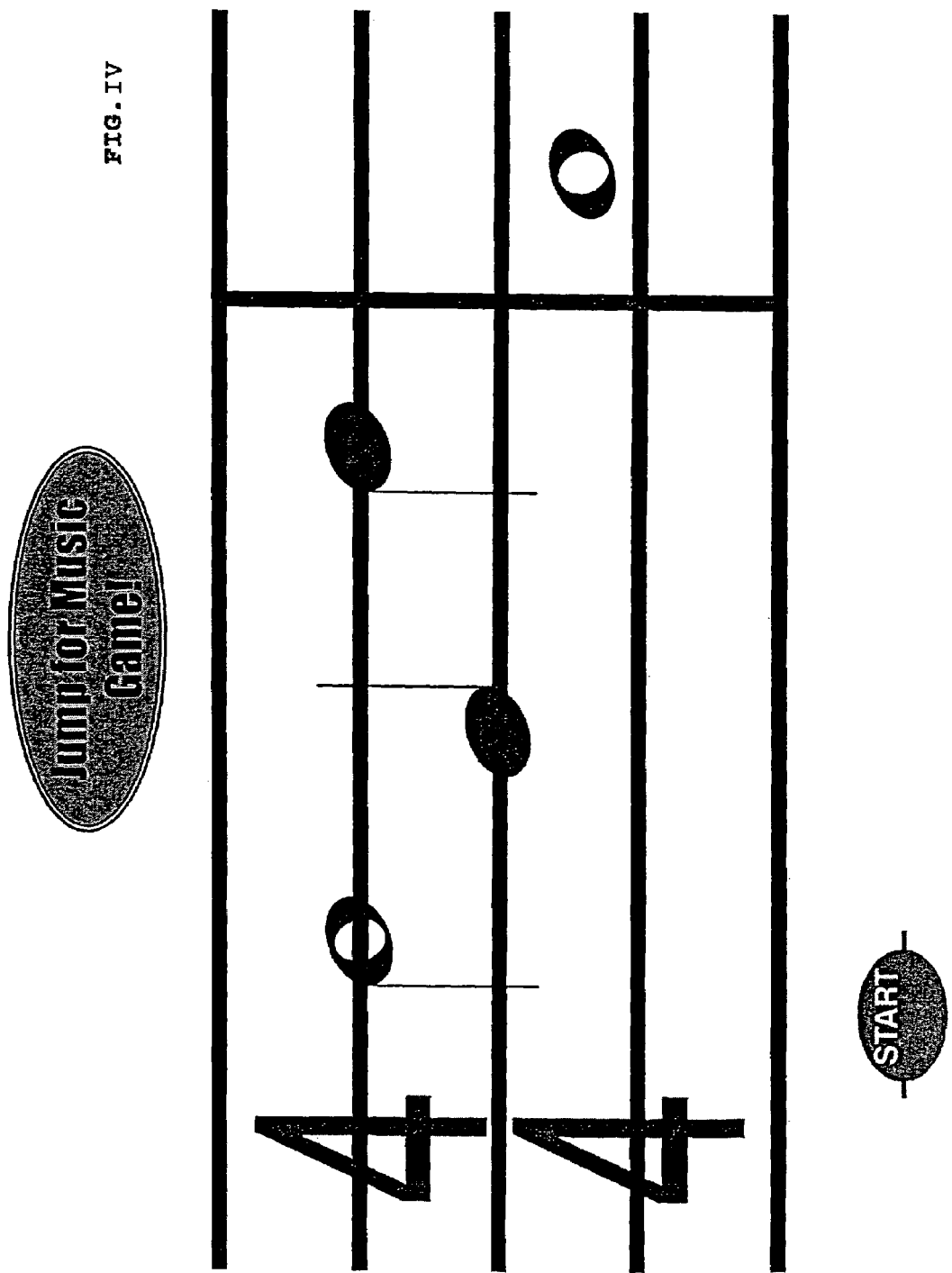

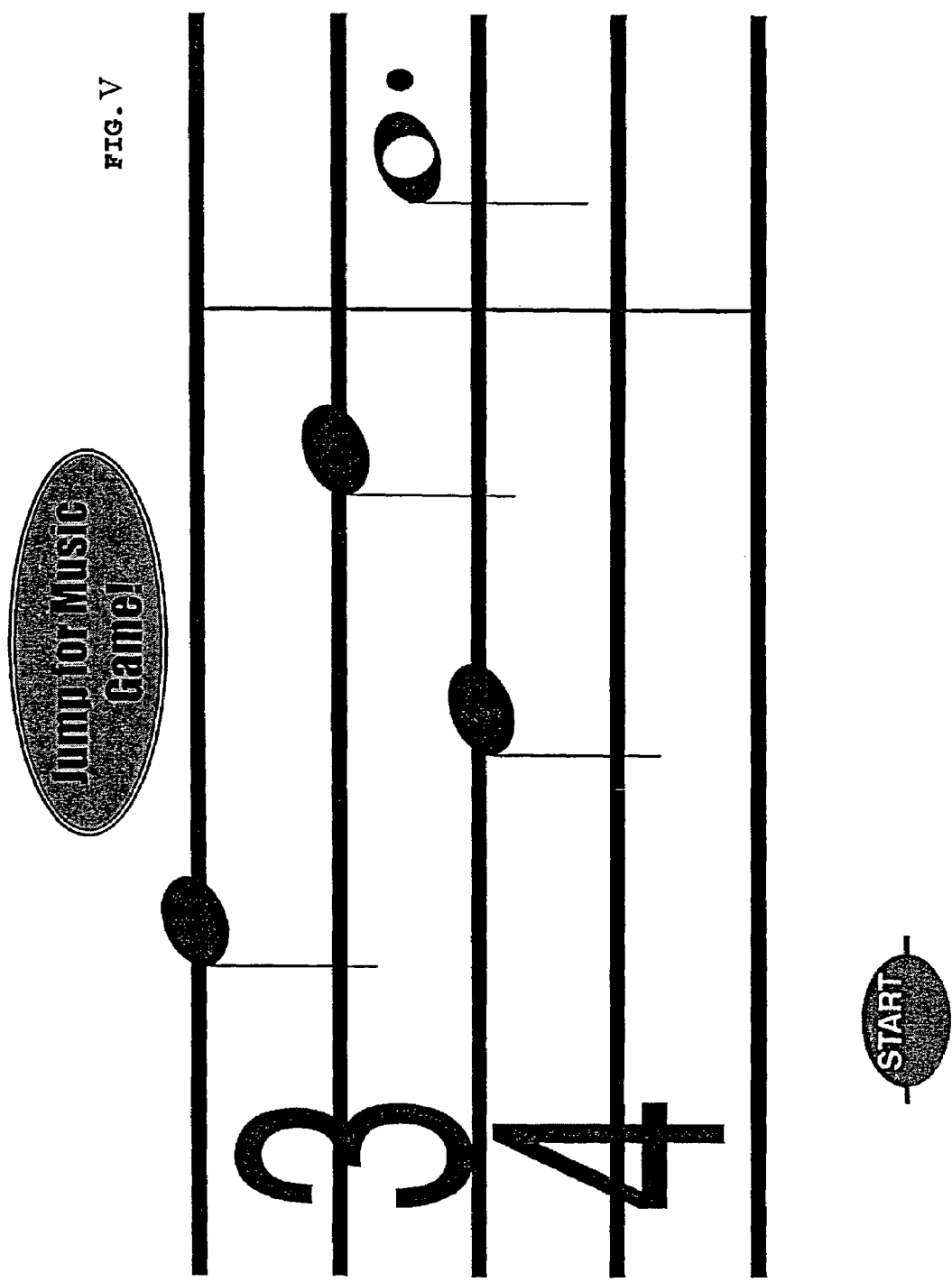

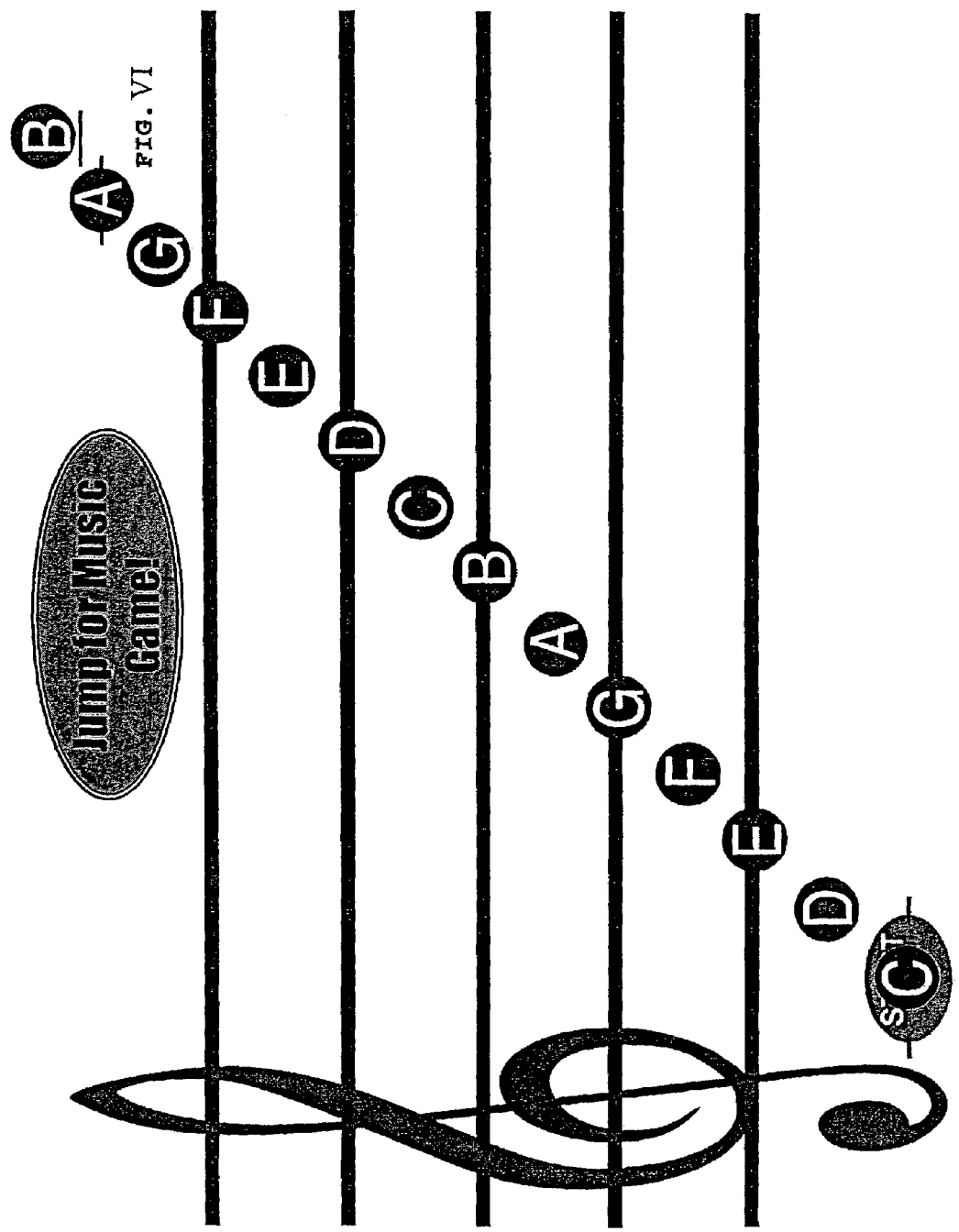

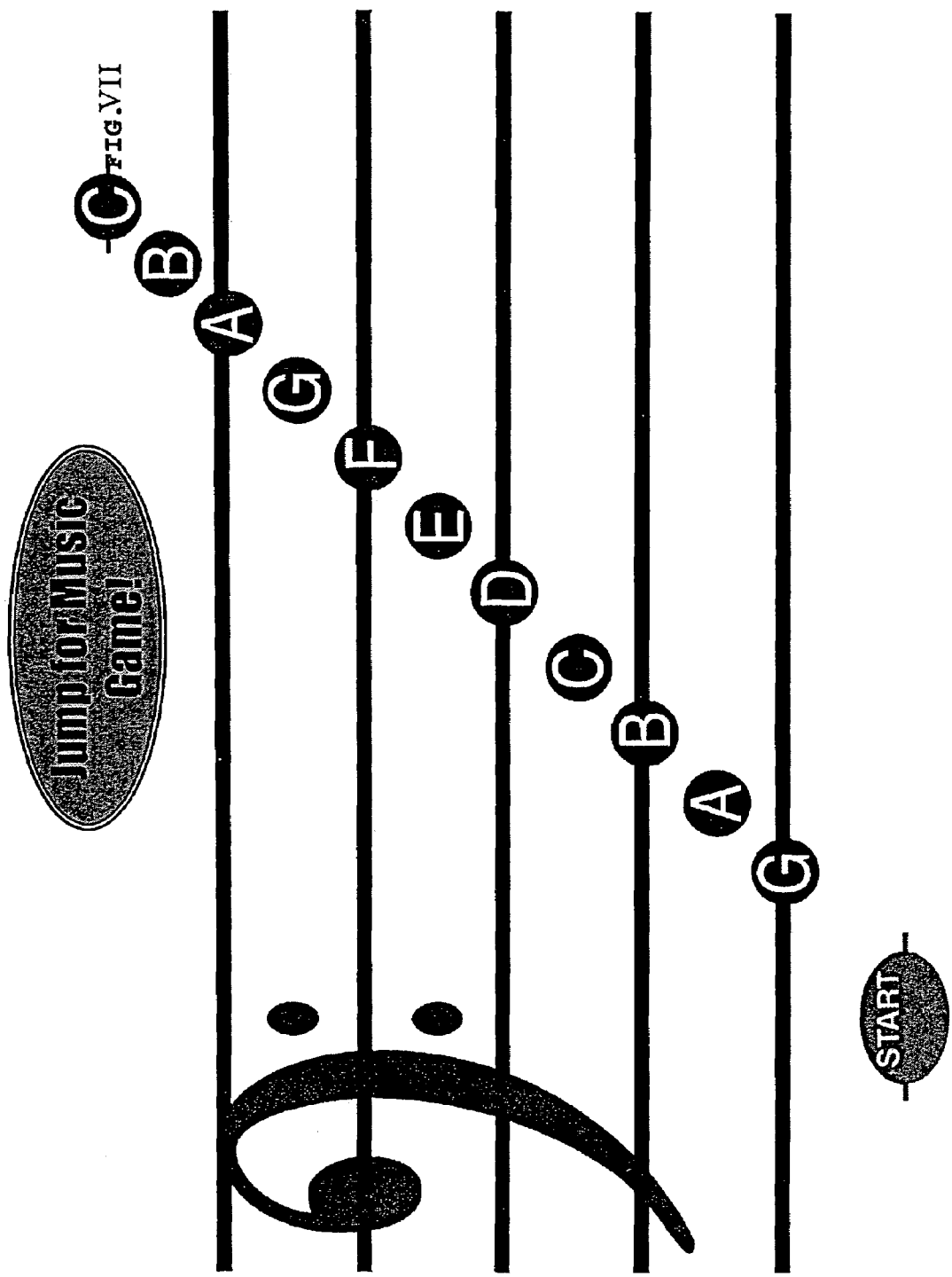

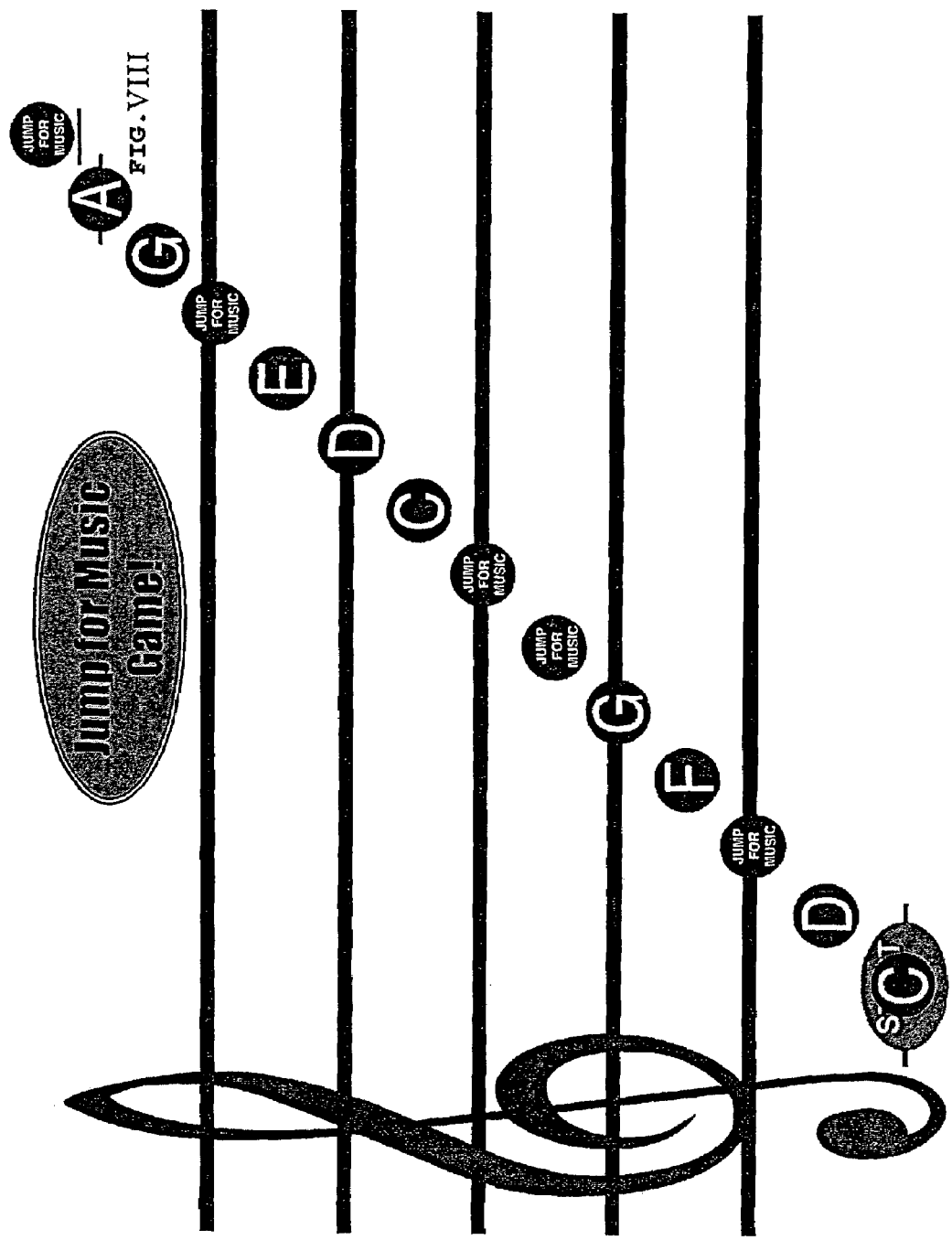

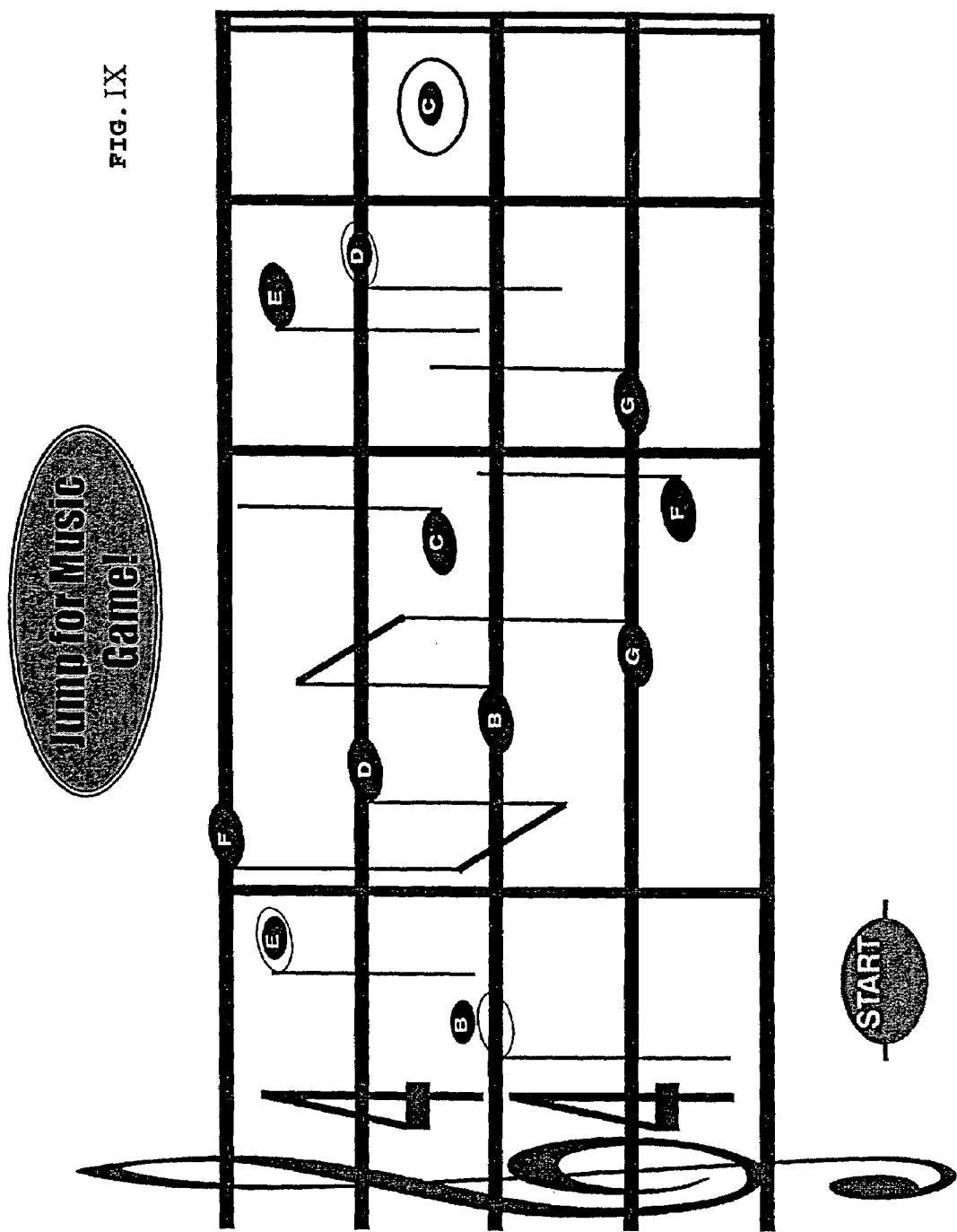

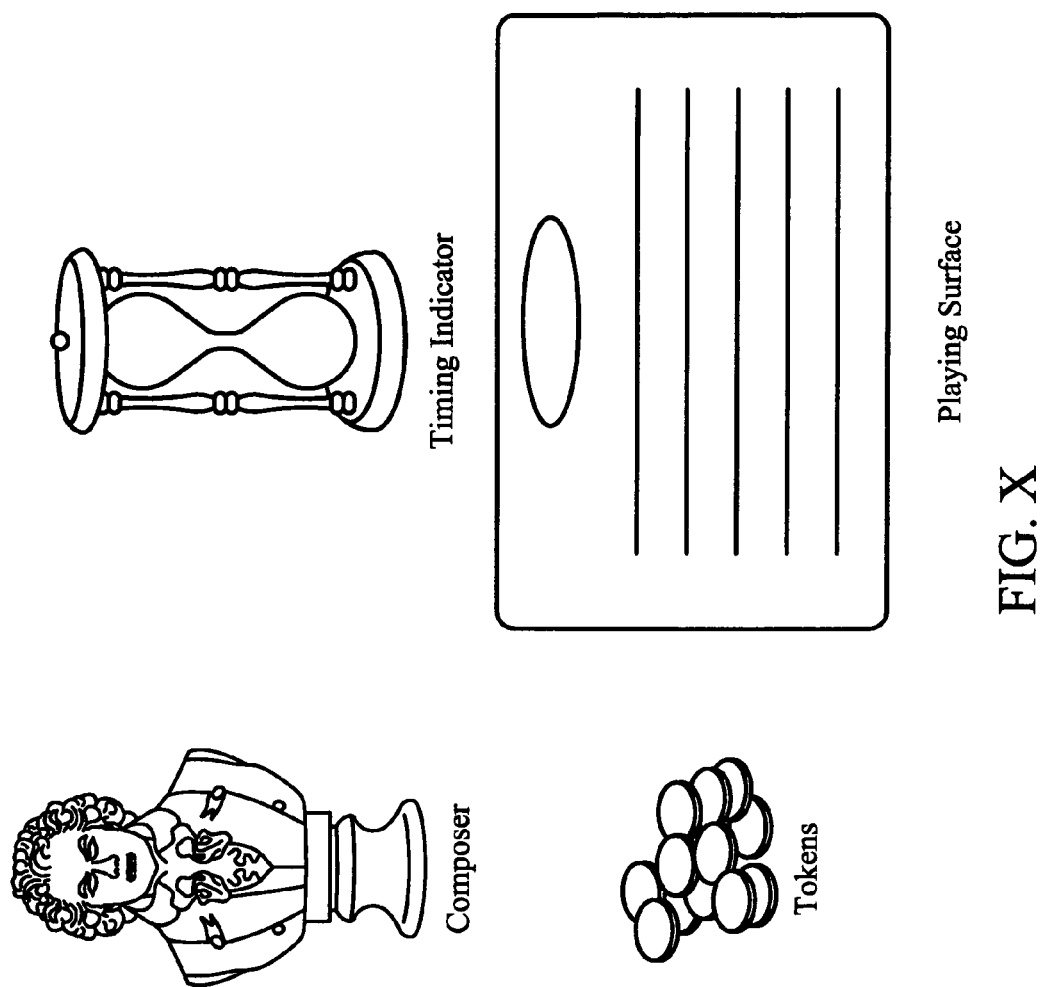
FIG. X

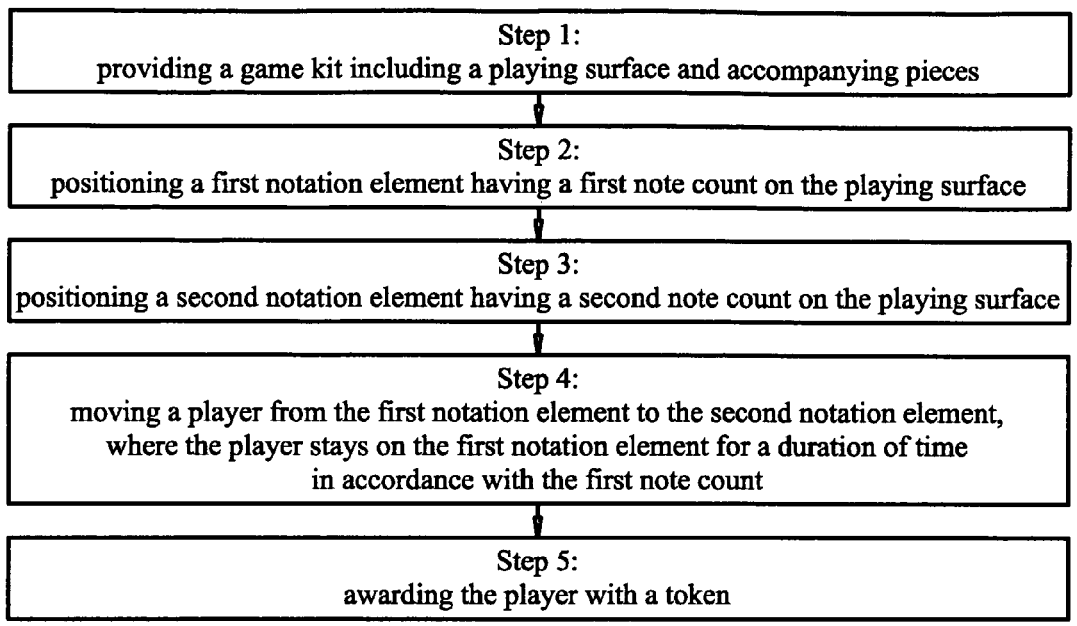
FIG. XI
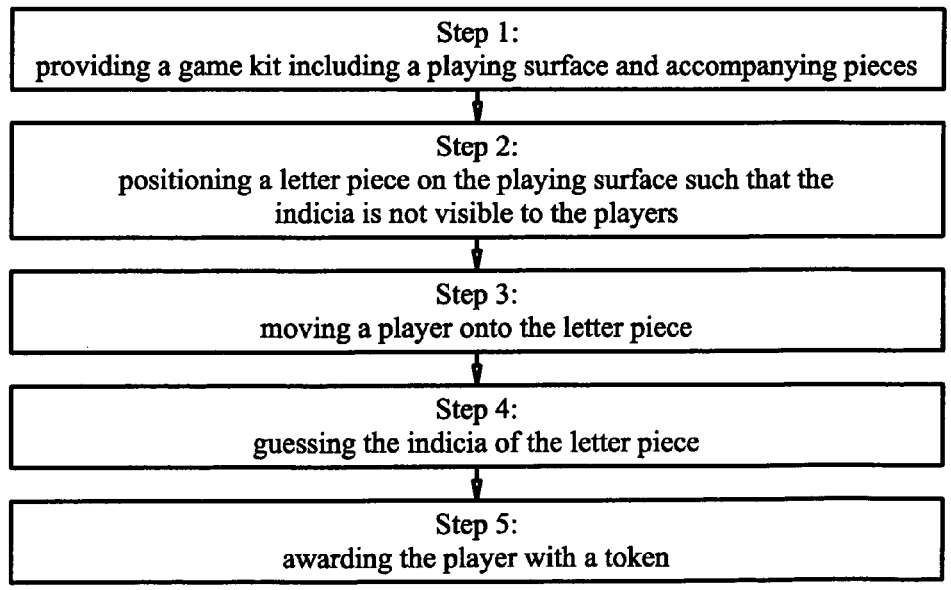
FIG. XII

JUMP FOR MUSIC GAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to the field of music. Specifically, this invention relates to musical games that allow players to play competitively to understand rhythms in music and enhance note reading.

This invention was made after 15 years of teaching students in a studio, with ages ranging from 3 to 18 years. Many students had difficulty understanding basic rhythms, and did not have a clear grasp of how lines and spaces worked. Most students could not remember types of notes or values and had difficulty relating notes to rhythms. When placed in theory classes, students found this boring and could not successfully relate music theory to actual playing.

I decided that with a game, the fundamentals of music would be more visual and fun thus enhancing learning. In the floor version of the game, notes would be large and colorful helping students to better relate to them. Rhythms would be interchangeable so students would be able to try simple rhythms and build those into more complex versions as their levels of understanding developed.

Tokens would be given at the end of each round, to help students or players compute note values thus enhancing the basis of rhythms. Notes and tokens would be color coded to help students remember note values easily.

Notes would be placed at different intervals on the board for each rhythm given to help students associate note names with pitch i.e. if a player jumps to C above middle C on the score and then to G below, this would help them to relate high movement with a high pitch and downward movement with a lower pitch, making it easier for students to equate the movement in the game with finger movement on an instrument like the piano or violin. Even a wind player like a trumpeter, could relate this game to playing on his instrument, since the amount of energy exerted to reach high pitches, could be equated with the amount of energy needed to jump to high notes on the board.

It is my expectation that this game will excite children, friends and family members to play and keep the art alive.

BRIEF SUMMARY OF THE INVENTION

This is a musical rhythms game designed to help players develop a better understanding of rhythms, music notation, intervals and note reading. It will also improve concentration and build coordination.

BRIEF DESCRIPTION OF THE SEVERAL VIEWS OF THE DRAWING

FIG. I depicts an empty game board. The starting point for players is indicated at the START symbol beneath the staff.

FIG. II shows samples of notes placed on the staff which are used in the "CLAP AND RAP" round of the game.

Figure 1:
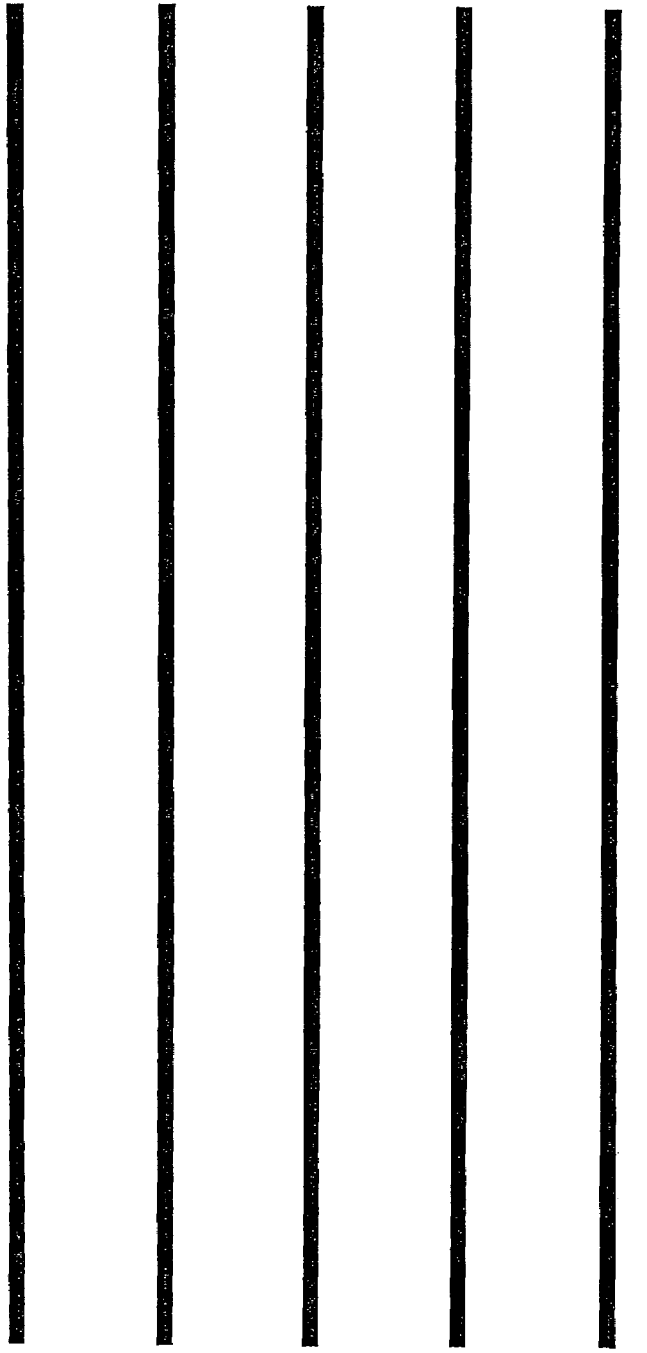

FIG. III illustrates the introduction of the time signature on a score.

FIG. IV presents a sample of a score in 4/4 time.

FIG. V shows a sample of a Level 1 configuration for 'Jump for Music.'

FIG. VI represents the introduction of the standard notes in the treble clef.

FIG. VII introduces the standard notes in the bass clef.

FIG. VIII shows a sample of notes to be named on the staff.

FIG. IX is a sample of a Level 2 score for 'Jump for Music.'

FIG. X illustrates an embodiment of a game kit in accordance with the present invention.

FIG. XI is a flow chart showing steps of an embodiment of a method for playing a game in accordance with the present invention.

FIG. XII is another flow chart showing steps of an embodiment of a method for playing a game in accordance with the present invention.

DETAILED DESCRIPTION OF THE INVENTION

Musical scores, staffs, notes and numbers have been around for hundreds of years, but movement of feet, or game pieces on a staff is a new concept. Other features that are new to this game are:

1. The ability to interchange rhythms on the staff creating a new score at each round of play
2. Notes are color coordinated with values
3. Tokens are based on note values Materials Manufacturing materials should be Ozone friendly. For the floor version of the game, most parts will be made from rubber whereas on the table version some parts will be made from cardboard and hard plastic.

Game Pieces

This game will include the following parts:

1. Music Staff

The music staff will comprise 5 black horizontal lines with 4 white spaces between these lines. The size of the floor version will be 4 ft. in height by 12 ft. wide. This will be made from rubber, due to its flexibility and non-skid properties and be folded to fit in a 1 ft.x4 ft. package.

The table version will be 3 ft. wide by 1 ft. tall.

2. Composers

These game pieces will allow movement to notes of different intervals on the staff of the table version only (note that in the floor version, the player actually moves rather than a composer). The composers will be modeled after the bust of past composers of musical periods. Heights of these pieces will range from 1 inch to 2 inches and widths from ½ inch to ¾ inch. These composers will be the models of Bach, Handel, Beethoven, Mozart, Chopin and Liszt. The composers will be made from hard transparent plastic in the shades of blue, pink, green, yellow, orange, red. They will make sounds upon contact with musical notation.

3. Musical Notation

Musical notation will be made from hard plastic to produce sound on contact for the table version only. The floor version will be made from rubber to prevent skid. The symbols for music notation will include the following:

Whole Notes;

Half Notes;

Quarter Notes;

Eighth Notes;

Dots will be used in combination with each kind of note.

4. Clefs

Treble and Bass Clefs will be used.

5. Time Signatures

Time signatures will be in 2/4, 3/4 and 4/4 times.

6. Letter Names

There will be 2 sets of letter names from the musical alphabet A to G. These will be oval in shape with the letter names imprinted on one side and the phrase 'Jump for Music' on the other.

7. Bar Lines

There will be 4 sets of bar lines and 1 set of double bar lines. Bar lines will be made from rubber and the color in black in the floor version and cardboard in the table version.

8. Tokens

All tokens will be oval in shape and note name imprinted on the front e.g. "Whole note token," with time values on the back e.g. "4 beats."

9. Hourglass

Hourglass will be designed to compute fifteen seconds during play.

Colors

Music notation will be in the following colors:

Whole notes (4 beats)—Red

Half notes (2 beats)—Lime

Quarter notes (1 beat)—Orange

Eighth notes (½ beat)—Yellow

Dots for dotted notes will be in all colors above to be used as needed.

Numbers for Time signature will be as follows:

2—Lime

3—Yellow

4—Red

Age Range of Players

The age range will be 4 and up for floor version and 6 and up for the table version.

Number of Players

There shall be a minimum of 2 players.

How to Play the Game

This game will include a play-along CD and DVD (table version optional) with accompanying rhythms. An instruction booklet and music information cards will be included. Players will select a dealer who gives direction in the game, tabulates scores and controls play.

Position of Players

Only 1 player goes on the music score at a time. All other players stand or sit around the score and tap the rhythm of the music if necessary.

A player loses a chance when he or she cannot move to the rhythm of the music placed on the music score or makes a wrong move.

Movement

A player starts on the left side of the music score at START (see FIG. 1). The player must land on the head of the note otherwise it is considered a wrong move.

There are 2 modes of movement. These are as follows:

(1) Regular

The player jumps to the rhythm of the music on the board.

(2) Advanced

The player moves as follows:

STEP (Interval of a $2^{nd}$)—When the next note is a line or space up or down from the note the player is on the player should step to it.

SLIDE—When the next note is the same the player makes a sliding motion to it.

SKIP (Interval of a $3^{rd}$)—When the next note is on the next line i.e. it skips a space, the player skips to it.

JUMP—(Interval over a $3^{rd}$)—When the next note is over the interval of a third, the player jumps to it.

Levels of Play

There will be two levels of play. In level one, rhythms will be simple in two to three bar lengths. In level two, rhythms will be more complex and up to four bars in length. Note reading is also introduced at this level.

Rounds

The game starts with a STAFF JUMP round. Rounds increase in difficulty up to Level 2. When all players have taken turns on each round, the music score changes to the next round. Rhythms at each level will vary according to age range and musical exposure. Rounds of play are as follows:

1. Staff Jump

See FIG. 1. Each player takes turn at START on the board, and proceeds to the top of the staff going from line to line and space to space alternately. Players will be asked to indicate the number of lines and spaces on the score, and to move to different intervals such as the $3^{rd}$ line, $4^{th}$ space etc.

2. Notes 'N Spot

Players will be introduced by the dealer, to different kinds of notes and values and asked to clap, counting the values for each note indicated. These notes will include whole notes, half notes, quarter notes and eighth notes. Note types will be introduced according to age levels and understanding.

3. Clap 'N Rap

See FIG. 2. The dealer will make simple rhythms by placing different notes at various intervals on the staff, based on the rhythm cards to be supplied.

Players will be asked to clap the rhythms given and take turn on the staff jumping on the head of each note and staying on them according to the values, i.e. if a note gets 2 counts, each player will jump on the note head at the count of 1 and stay until the count of 2 and so on. Different intervals will be used to make jumping fun!

4. Time Line

Simple time signatures will be introduced (see FIGS. 3 and 4), and players will be asked to clap and count the beats. If there are 3 counts to the bar, players will count: 1-2-3 for each bar, and stay on the notes accordingly.

Each player will take turn on the board jumping while the remaining players clap to the rhythm.

5. Jump for Music Level 1!

With the introduction of note values and time signatures, players will be ready to play Jump for music Level 1. See FIG. 5 for sample of a complete board.

6. Jump for Music Level 2!

After playing Jump for music level 1 competently, players can play at level 2. This level will include the introduction of note reading—NAME 'EM NOTES, with more complex rhythms of up to 4 bars in lengths placed at various intervals.

Name 'em Notes

Notes of the Treble and Bass clefs will be introduced alternately (see FIG. 6 for treble clef notes, and FIG. 7 for bass clef notes). Clues for naming notes will be as follows:

Treble clef starting from line 1 above START:

Every Fine Girl And Boy Can Do Easy Fun Games At Best

Bass Clef starting from line 1 above START:

Girls And Boys Can Do Easy Fun Games At Best

The board will then be cleared and players asked to place all the letter names at the correct location on the score. Some letter names will be placed faced down (see FIG. 9) and players will take turn to jump to the location and guess each name.

Players will be asked to jump to more complex rhythms than those in Level 1 of the game and upon completion, place letter names on the head of each note.

How to Score

The goal is for players to get as many whole note tokens as possible. Each player will be given a whole note token at the beginning of play. When a player completes each round of the music in perfect time he or she gains a quarter note token. These tokens can be traded for notation tokens of higher values. If a player gets a rhythm incorrectly then an eight note token is given.

The player who gets the most whole note tokens becomes the winner. The value of tokens is as follows:

Eighth note token gets ½ beat
Quarter note Token gets 1 beat
Half note Token gets 2 beats
Whole notes Tokens gets 4 beats

I claim:

1. A game kit, comprising:
a playing surface having a music staff, wherein the music staff includes five horizontal lines with four spaces therebetween; the playing surface further including a start position,
a plurality of notation elements positionable about the playing surface, wherein the plurality of notation elements are shaped in the form of one or more musical notes;
a plurality of letter pieces positionable about the playing surface, wherein each of the plurality of letter pieces includes an indicia corresponding to a letter of a musical note;
a plurality of tokens, wherein each token includes a scoring value; and at least one of an audio recording and video recording.

2. The game kit according to claim 1, wherein the playing surface measures approximately four feet in height and twelve feet in width.

3. The game kit according to claim 1, wherein the playing surface measures approximately one foot in height and three feet in width.

4. The game kit according to claim 1, further comprising a plurality of game pieces movable about the playing surface.

5. The game kit according to claim 4, wherein at least one of the plurality of game pieces is shaped in the form of a bust of a musical composer.

6. The game kit according to claim 4, wherein the plurality of game pieces vary in color.

7. The game kit according to claim 1, wherein the plurality of notation elements vary in color.

8. The game kit according to claim 1, wherein the plurality of notation elements includes a time signature element positionable about the playing surface.

9. The game kit according to claim 1, further comprising a timing indicator.

10. The game kit according to claim 9, wherein the timing indicator is an hourglass.

11. A game kit, comprising:
a playing surface having a music staff, wherein the music staff includes five horizontal lines with four spaces therebetween; the playing surface further including a start position,
a plurality of notation elements positionable about the playing surface, wherein the plurality of notation elements are shaped in the form of one or more musical notes, and wherein at least one of the plurality of notation elements is able to emit a sound upon experiencing contact;
a plurality of letter pieces positionable about the playing surface, wherein each of the plurality of letter pieces includes an indicia corresponding to a letter of a musical note; and
a plurality of tokens, wherein each token includes a scoring value.

12. A method for playing a game for one or more players, comprising the steps of:
providing a game kit including a playing surface having a music staff, wherein the music staff includes five horizontal lines with four spaces therebetween; a plurality of notation elements positionable about the playing surface, wherein the plurality of notation elements are shaped in the form of one or more musical notes; a plurality of letter pieces positionable about the playing surface, wherein each of the plurality of letter pieces includes an indicia corresponding to a letter of a musical note; and a plurality of tokens, wherein each token includes a scoring value;
positioning a letter piece on the playing surface such that the indicia is not visible to the players;
moving a player onto the letter piece; and
guessing the indicia of the letter piece.

13. The method according to claim 12, further comprising the step of awarding the player with a token upon a correct guess.

14. A method for playing a game for one or more players, comprising the steps of:
providing a game kit including a playing surface having a music staff, wherein the music staff includes five horizontal lines with four spaces therebetween; a plurality of notation elements positionable about the playing surface, wherein the plurality of notation elements are shaped in the form of one or more musical notes; a plurality of letter pieces positionable about the playing surface, wherein each of the plurality of letter pieces includes an indicia corresponding to a letter of a musical note; and a plurality of tokens, wherein each token includes a scoring value;

positioning a first notation element having a first note count on the playing surface;

positioning a second notation element having a second note count on the playing surface; and moving a player from the first notation element to the second notation element, wherein the player stays on the first notation element for a duration of time in accordance with the first note count.

15. The method according to claim 14, further comprising the step of awarding the player with a token.

16. The method according to claim 14, wherein the game kit further includes a plurality of game pieces, wherein the step of moving a player includes moving one of the plurality of game pieces about the playing surface.

* * * * *